United States Patent [19]

Bianco et al.

[11] Patent Number: 4,806,303

[45] Date of Patent: Feb. 21, 1989

[54] METHOD AND APPARATUS FOR THE PRODUCTION OF PERFORATED FILMS, PARTICULARLY PERFORATED FILMS OF PLASTICS MATERIAL FOR SANITARY ARTICLES

[75] Inventors: Carlo Bianco; Pietro Susi, both of Pescara, Italy

[73] Assignee: Fameccanica S.p.A., Sambuceto, Italy

[21] Appl. No.: 47,619

[22] Filed: May 7, 1987

[30] Foreign Application Priority Data

May 7, 1986 [IT] Italy .............................. 67374 A/86

[51] Int. Cl.[4] .......................... B26F 1/26; B26F 3/06; B29C 59/06

[52] U.S. Cl. ................................... 264/5.04; 264/154; 264/322; 425/290; 425/294; 425/DIG. 37; 425/503

[58] Field of Search ....................... 264/504, 154, 322; 425/290, 294, DIG. 37

[56] References Cited

U.S. PATENT DOCUMENTS

| | | | |
|---|---|---|---|
| 3,012,918 | 12/1961 | Schaar | 264/154 X |
| 3,054,148 | 9/1962 | Zimmerli | 264/154 |
| 3,092,439 | 6/1963 | Harrison | 264/154 |
| 3,394,211 | 7/1968 | MacDuff | 264/154 |
| 3,549,858 | 12/1970 | Larive et al. | 264/154 X |
| 3,560,601 | 2/1971 | Johnson et al. | 264/154 X |
| 3,707,102 | 12/1972 | Huppenthal et al. | 264/154 X |
| 3,718,059 | 2/1973 | Clayton | 264/154 X |
| 4,151,240 | 4/1979 | Lucas et al. | 264/154 X |
| 4,248,822 | 2/1981 | Schmidt | 264/154 |
| 4,280,978 | 7/1981 | Dannheim et al. | 264/154 X |
| 4,317,792 | 3/1982 | Raley et al. | 264/154 X |

FOREIGN PATENT DOCUMENTS 0138601 4/1985 European Pat. Off. .

*Primary Examiner*—Philip Anderson

*Attorney, Agent, or Firm*—Lahive & Cockfield

[57] ABSTRACT

A softened unperforated film and a perforated die which is generally cylindrical in movement are brought into contact and exposed, in a predetermined region, to a pressure gradient oriented radially of the die. The pressure gradient causes the local penetration of the film into the holes of the die and the consequent perforation of the film itself. The movement of the die is supported in a rigid manner solely upstream and downstream of the predetermined region in the common direction of movement of the film and the die. The die itself is subjected to a pulling action, along its generatrices at least close to the predetermined region.

18 Claims, 2 Drawing Sheets

METHOD AND APPARATUS FOR THE PRODUCTION OF PERFORATED FILMS, PARTICULARLY PERFORATED FILMS OF PLASTICS MATERIAL FOR SANITARY ARTICLES

DESCRIPTION

1. Field of the invention

The present invention relates in general to the production of perforated films, preferably for use in the sanitary field. In particular, it concerns the production of sheets of plastics material which are rendered permeable by means of perforation and can be used as covering sheets in disposable sanitary products, such as diapers for children or incontinence pads for adults, sanitary towels for women, sticking plasters, bandages, etc., instead of the usual coverings of non-woven textile.

2. Description of the prior art

Films of perforated thermoplastics material for sanitary uses, decorative uses, etc. are known and methods and apparatus for their production are also known.

Generally, the method for the manufacture of such perforated films may start from either a direct extrusion of an unperforated film of plastics material such as, for example, low-density polyethylene, or a similar unperforated film which has already been formed. In both cases, the film to be perforated (which is already in a softened plastic state in the case of direct extrusion or is brought to this state by the application of heat in the case of a preformed film) is made to conform to the design of a metal die (generally cylindrical and rotary) by means of a force induced by a pneumatic pressure gradient which acts through the die and causes the local penetration of the film into the holes in the die. Thus, the film is made to reproduce the design of the die with the possibility of achieving perforation of the film itself.

For an indicative example of the prior art reference may be made to the U.S. Pat. No. 3,054,148.

In the perforation apparatus described in this patent, the die is constituted essentially by a cylindrical perforated sheet which rotates on a similarly cylindrical drum, sliding on the surface thereof. A portion of the peripheral surface of the drum is removed so as to form a suction aperture through which a pressure gradient is established which causes the local penetration of the softened film into the holes in the die.

For the sheets of perforated plastics material to be substituted conveniently and advantageously for the sheets of non-woven textile as permeable coverings for disposable sanitary products, they must offer a performance comparable to, if not better than, that offered by non-woven textiles and a low cost.

With regard to the performance aspect, it is clear that the design (that is, the distribution and the dimensions of the holes) in the die should be as fine as possible so that the perforated film can offer the user of the products a visual and tactile sensation similar to that offered by a textile.

With regard to the costs, in addition to numerous factors, such as the starting material, the rate of production, the absorption of energy, a determining component is the dies which are more difficult and expensive to make the more strongly the objective of making the perforated plastics sheet like a textile is pursued.

The forming dies are constituted by a cylinder or an endless belt (that is, a "generally cylindrical" structure) which is perforated in accordance with the design to be imparted to the film. Whatever the process used for the manufacture (photoengraving, electrodeposition of nickel, mechanical perforation) for constructional and economic reasons, in order to obtain the desired detail, the thickness of the forming die is generally very small (of the order of mm or even less) against diameters of 500 mm and more and lengths of even more than a metre. The die thus lacks intrinsic rigidity and it is necessary to support it in an adequate manner to prevent it from breaking, particularly in the region where perforation of the film occurs. In this region, the die is in fact subjected to forces due to the action of the pressure gradient and also to heat stress due to the fact that the film, which must be in a softened state, is heated or at least kept under conditions of heating.

In the prior art, this problem has usually been solved by the support of the forming die by means of an internal stiffening drum or cylinder. This inner drum or cylinder may be a continuous wall, as in the case of the solution explained in U.S. Pat. No. 3,054,148 mentioned above, or a perforated or apertured wall, as in the case of the prior art referred to in European patent application No. 0138601. This same application proposes the support of the forming die, at least in the region in which the pressure gradient acts, through a sort of perforated grille which can effect a sprung movement in a generally radial direction relative to the die, which in practice is a multi-layer die resulting from the superposition of several perforated sheets.

The prior-art solutions, however, give rise to a series of disadvantages in the finished product, particularly when the thickness of the die is very small, that is comparable to the thickness of the perforated film produced. Since the die slides on the inner stiffening cylinder, there are zones of contact between the die and the supporting cylinder both when the supporting cylinder is a continuous wall and when the cylinder itself is a perforated or slotted wall. As a result of the presence of these zones, the finished product may have holes which are not perfectly opened and may even be free from holes in certain regions because of the total or partial occlusion of the holes of the forming die by the supporting cylinder. This same disadvantage may occur in the case of supporting grilles which are stationary relative to the die, when the forming dies are very thin, with a thickness similar to or even less than the thickness of the perforated film produced. This is particularly true for dies made by electrodeposition of nickel, which offer a good compromise between the quality of the film produced (considerable fineness of the perforation design - with a high degree of open area, that is, small holes very close together) and the cost.

OBJECT OF THE INVENTION

The main object of the present invention is to provide a method and apparatus for producing perforated films which do not give rise to the disadvantages described above (the presence of unopened holes or partly opened holes).

A further object of the present invention is to provide a method and apparatus for producing perforated films, in which the support of the perforation die is effected so as to minimise the risks of breakage and deformation of the die itself.

SUMMARY OF THE INVENTION

In order to achieve the objects described above, the present invention has for its subject a method for the production of perforated films, in which a softened unperforated film and a perforated die which is generally cylindrical in movement are brought into contact and exposed, in a predetermined region, to a pressure gradient which acts substantially radially of the die to cause the local penetration of the film into the holes in the die and the consequent perforation of the film, characterised in that it includes the steps of:

supporting the movement of the die in a substantially rigid manner solely upstream and downstream of the predetermined region in the common direction of movement of the film and the die, and subjecting the die to a pulling action along its generatrices, at least in proximity with the predetermined region.

A further subject of the invention is apparatus for the production of perforated films, in which a softened unperforated film and a perforated die which is generally cylindrical in movement are brought into contact and exposed, in a predetermined region, to a pressure gradient which acts radially of the die to cause the local penetration of the film into the holes in the die and the consequent perforation of the film itself, characterized in that it includes:

a rotary cylindrical body with two circular end edges and a perforated peripheral wall portion constituting the die, two rigid support members extending in the direction of the generatrices of the cylindrical body in a position of sliding support for the perforated peripheral wall portion constituting the die, and together defining the predetermined region, support means for the cylindrical body, including pulling members which cooperate slidingly with the circular end edges and can apply a pulling action to the cylindrical body along its generatrices, and pump means acting in the predetermined region in order to generate the pressure gradient.

DETAILED DESCRIPTION OF THE INVENTION

Figure 2:
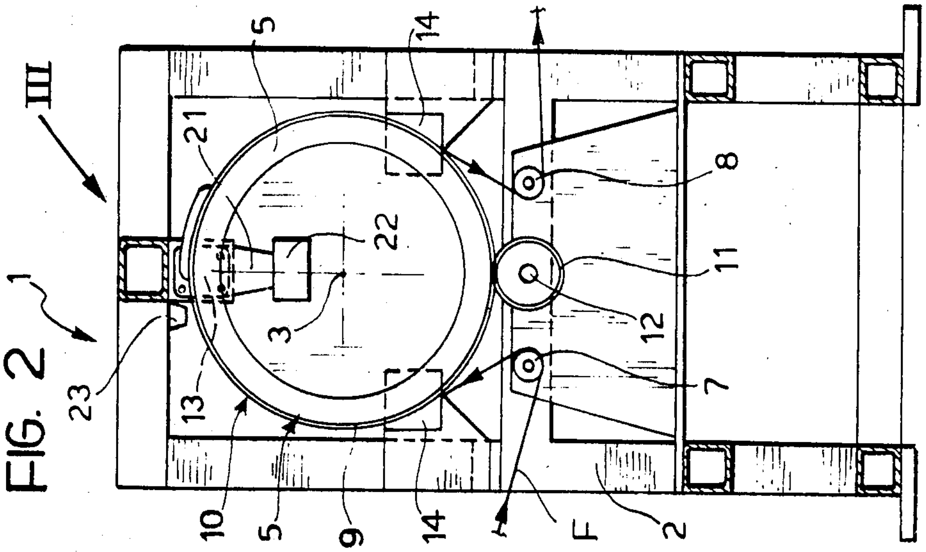
Figure 1:
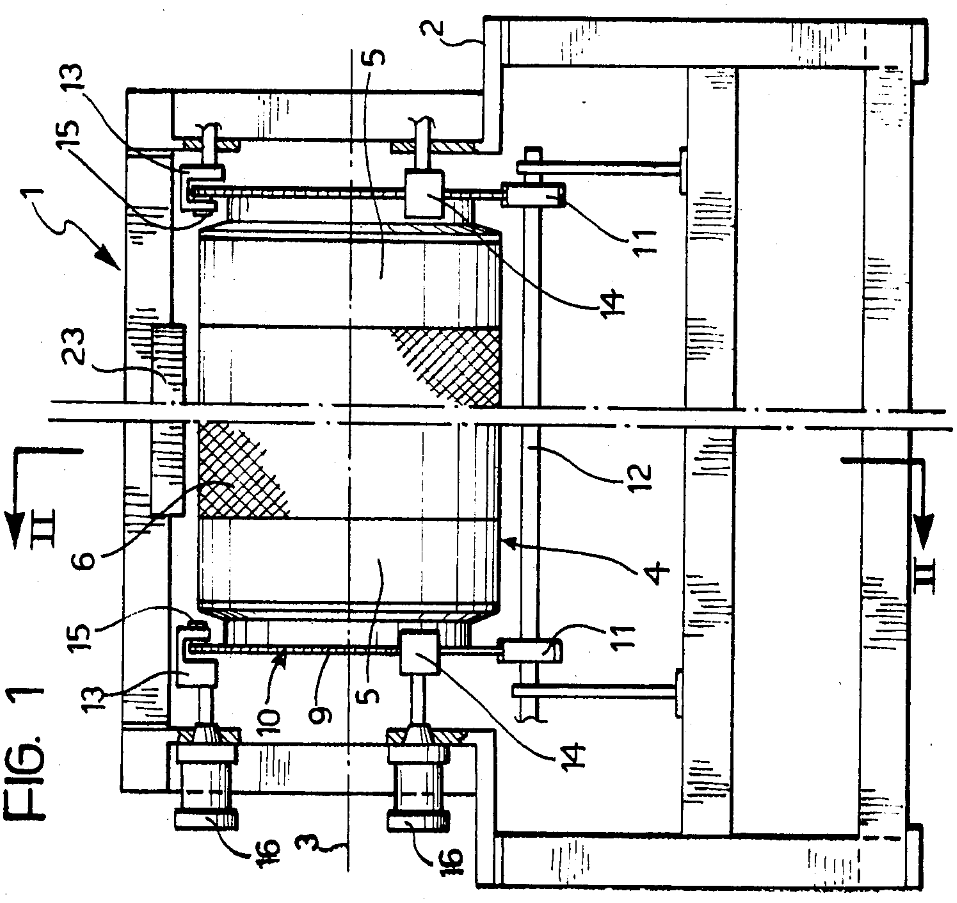
Figure 4:
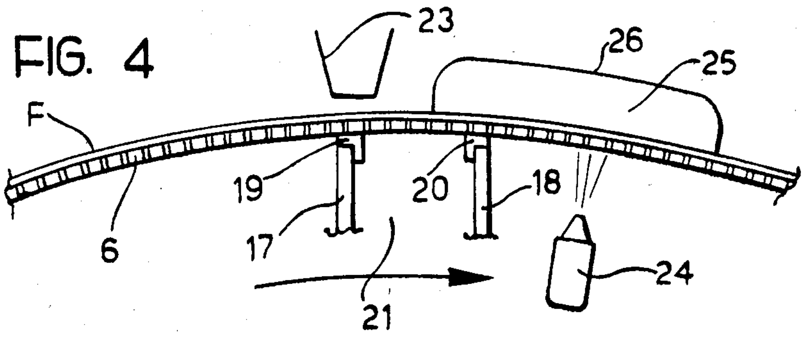
Figure 3:
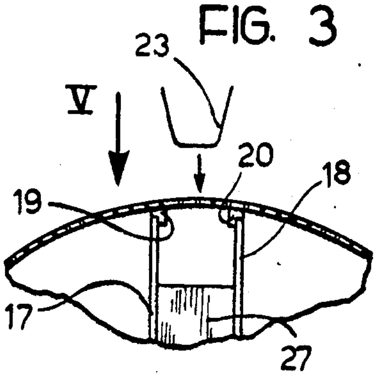
Figure 5:
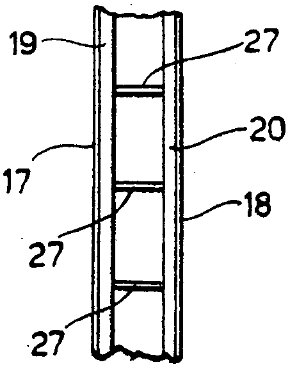
Figure 6:
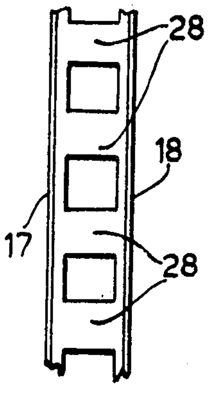
Figure 7:
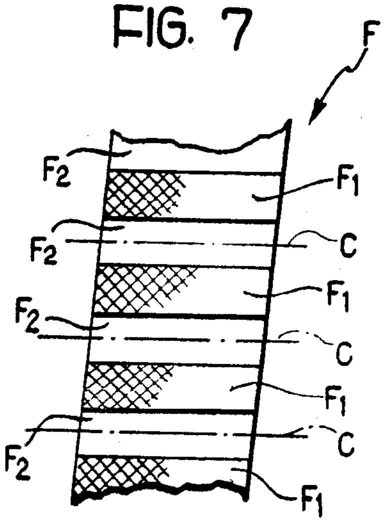
Figure 8:
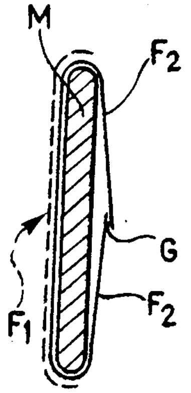

The invention will now be described, purely by way of non-limiting example, with reference to the appended drawings, in which:

FIG. 1 is a partly sectioned, cut-away, front elevational view of apparatus according to the invention, FIG. 2 is a section taken on the line II—II of FIG. 1, FIG. 3 is a view of the portion of FIG. 2 indicated by the arrow III on an enlarged scale, in which some parts have been removed to clarify the illustration, FIG. 4 is a view corresponding essentially to the view of FIG. 3, with the illustration of several accessories of the device of the invention, FIG. 5 corresponds essentially to a view taken on the arrow V of FIG. 3, FIG. 6 illustrates a variant of the structure illustrated in FIG. 5, and FIGS. 7 and 8 illustrate schematically the results which can be obtained with the variant of FIG. 6.

In the embodiment illustrated, the apparatus according to the invention, generally indicated 1, is constituted essentially by a frame 2 on which a cylindrical body 4 is mounted for rotation about a horizontal axis 3. The body 4 is constituted essentially by two annular end bodies 5 connected by a perforated band 6 (die) constituting the central portion of the peripheral wall of the cylindrical body 4.

The die 6 is constituted by a screen made, for example, by electrodeposition of nickel. One is thus dealing essentially with a screen of the type currently used in colour printing processes.

The design (distribution, density, dimensions, shape) of the holes of the die 6 essentially reproduce the design of perforations to be imparted to a plastics film F, such as a polyethylene film, which unwinds from a supply roller 7 to a drive and collection roller 8. As best seen in FIG. 2, the film F forms a loop which passes around the cylindrical body 4 and the die 6 in a generally omega configuration.

By way of reference, the die 6 with which the film F is brought into contact may have an outer diameter, corresponding to the overall diameter of the cylindrical body 4, of 516 mm, a thickness of 0.4 mm, and a length of 1200 mm.

The die 6 is connected to the bodies 5 around their end edges by riveting, welding or gluing.

However, it should be noted that, because of the small thickness of the die 6, the cylindrical body 4 is not torsionally rigid and its central portion, constituted by the die 6, can bend and form local depressions as a result of any radial pressure exerted on it.

Each of the bodies 5 has a circular flanged edge 9 on its outer side, that is, on its side opposite the die 6, provided with external toothing 10. Both the edges 9 are thus able to mesh with respective wheels 11 which are rotated about a horizontal axis by a common keyed shaft 12 driven by a motor, not shown in the drawings.

The bodies 5, and hence the cylindrical body 4 in its entirety, are supported on the frame 2 so as to be rotatable about the axis 3 by an assembly of jaw members 13 and 14. The jaw members which pass over the end edges 9 are located in pairs aligned along the generatrices of the body 4 in equiangularly-spaced positions around the cylindrical body 4 itself.

In particular, the embodiment illustrated is provided with a first pair of jaw members 13 aligned along the top generatrix of the cylindrical body 4 and two further pairs of jaw members 14 aligned with each other in positions spaced angularly by 120° from the pair of members 13.

Each jaw member 13, 14 carries at least one roller 15 which acts as a thrust bearing which can roll on the inner face, that is, the face facing the die 6, of the flanged edge 9 of the respective annular body 5.

Each body 5 is thus supported so as to be rotatable about the axis 3 by three jaw members 13, 14 spaced at 120° from each other.

In particular, the jaw members 13, 14 disposed at one end of the cylindrical body 4, for example, those illustrated in the right-hand part of FIG. 1, are fixed to the frame 2.

Each of the jaw members 13, 14 mounted at the opposite end (the left-hand part of FIG. 1) is mounted instead on the rod of a pneumatic jack 16 which can cause a movement of the respective jaw member 13, 14 in an axial direction, that is, in the direction of the generatrices, relative to the cylindrical body 4.

More particularly, the jacks 16 are able to return the jaw members 13, 14 mounted thereon in the direction of movement away from the jaw members 13, 14 mounted on the opposite end of the cylindrical body 4. Thus, it is possible to exert on the cylindrical body 4 an axial pulling force of adjustable magnitude, which is translated into a pulling action exerted on the die 6 in the direction of its generatrices.

The purpose of this pulling action is to cause "dynamic" stiffening of the die 6.

As a result of the pulling action exerted along the generatrices and as a result of the common connection of both the annular bodies 5 to the drive shaft 12 (a connection effected with identical drive gears 10, 11), the cylindrical body 4, and particularly the die 6, behaves substantially as a rigid body capable of rotating about the axis 3 (in a clockwise sense, in the drawing illustrated in FIG. 2) without being subjected to considerable torsional stress.

In correspondence with the top generatrix, that is, the region which is highest with respect to the frame 2, the die 6 is supported by two adjacent support members 17 and 18 constituted by two blades located in fixed positions relative to the frame 2 and extending axially relative to the cylindrical body 4, that is, in the direction of the generatrices of the die 6.

The support members 17 and 18 are provided with lips 19 and 20 of substantially rigid, low-friction material on their facing surfaces which cooperate slidingly with the die 6.

As a result of the pulling action exerted on the annular bodies 5 driven by the shaft 12, the die 6 rotates about the axis 3 and slides on the lips 19 and 20 of the support members 17 and 18. The latter define between them a suction cavity 21 which is closed at the ends of the die 6 by walls, not illustrated, and communicates with a suction duct 22 (FIG. 2) mounted on the frame 2 within the cylindrical body 4.

The suction duct 22 communicates with a suction pump, not illustrated, which, when activated, enables pressure gradient to be established through the portion of the die 6 facing the cavity 21 at any moment. This pressure gradient, acting in a generally vertical direction relative to the die 6, is such as to cause, through the die 6 itself, a flow of air which is drawn from the exterior of the cylindrical body 4 through the die, enters the cavity 21 and then passes into the suction duct 22.

The disposition of the members 17 and 18 with their lips 19 and 20, therefore, is such that the movement of the die 6 in correspondence with the region in which the pressure gradient is established is supported substantially rigidly only upstream and downstream (in the direction of common movement of the die 6 and the film F) of the region in which the gradient is established. There are thus substantially no support members located in the region between the members 17 and 18, in which the pressure gradient is generated.

At the same time, the die 6 is subjected to a pulling action along its generatrices exerted by the jaw members 13.

The region of the die 6 which is subject to the action of the pressure gradient is thus firmly tensioned and cannot bend or twist under the forces to which it is subject.

A heating source, indicated 23, is constituted essentially by an aperture which directs an intense flow of hot fluid, for example air, onto a portion of the film, indicated F, which, at that moment, is passing through the region in which the pressure gradient acts as a result of the pulling action exerted by the die.

The function of the air from the aperture 23 (for example, at a temperature of the order of 300° C.) is to heat the film F, bringing it to a softened state. Thus, the pressure gradient which acts through the die 6 causes the local penetration of the film F into the holes of the die 6 itself and the consequent perforation of the film F.

The Applicants have found that the fact that the die 6, and hence the film F, is supported locally in a substantially rigid manner by the members 17 and 18 enables the position of the film F which is being heated to be determined very precisely relative to the aperture 23.

In particular, the portion of film F which is being heated and perforated is always in the same position relative to the aperture 23, without oscillations such as those which could occur with a resilient support for the die 6 and the film F or as a result of local deformation of the die 6. This fixed positioning enables extreme homogeneity to be achieved in the perforating action, without fluctuations in the dimensions of the holes opened in the film.

In FIG. 2 and in the enlarged view of FIG. 3, the aperture 23 is illustrated in its position of assembly immediately upstream of the region in which the pressure gradient acts, that is, approximately on the "vertical" of the support member 17. Naturally, this is only one of the possible choices. In particular, the direction and intensity of the flow of heating fluid emitted by the aperture 23, as well as its temperature, can be selected in a coordinated manner rotation of the cylindrical body 4), these being adapted to the characteristics of the material which is to be perforated, the thickness thereof, the temperature of the film F before it reaches the region of perforation.

To this end, it should be noted that, when the film F is extruded directly onto the forming cylinder 10, for example, close to the suction zone, the subsequent heating of the film F itself adjacent the perforation region may not be required.

In both cases, that is, in the case of direct extrusion of the film onto the die and in the case of a preformed film which is heated to bring it to a softened state, it may be useful to cool the die 6 selectively.

FIG. 4 illustrates schematically one solution adopted to allow the cooling of the die 6 and of the film F drawn by it.

A spray source, indicated 24, is constituted by a nozzle which is mounted on the frame 2 within the cylindrical body 4 and sprays a jet of water onto the inner surface of the die 6. The nozzle 24 is located adjacent the support member 18 disposed in a downstream position, that is, in correspondence with the downstream portion (in the direction of movement of the die 6 and the film F) of the region in which the pressure gradient acts, in the direction of common movement of the die 6 and the film F.

The jet of cooling water hits the die 6, passing at least partly through the holes provided therein and the open holes of the film F. The fraction of the flow of cooling water which passes through the die 6 and the perforated film F diffuses into a closed collecting vessel 25 defined by a cover 26 (casing) which extends at its edges so as also to cover the region 21 in which the pressure gradient acts. Consequently, part of the flow of cooling water is returned to the space 21, again passing through the film F which has just been perforated and the die 6.

The cooling action on the die favours the detachment of the thick film from the die, it also being possible, however, to detach the film from the die immediately downstream of the cooling zone if desired. Moreover, a certain cooling action is also exerted on the film F, which has the effect of stabilising the film F just perforated so as to prevent the apertures formed therein from closing again, even partially.

As has been seen, in the region of perforation, that is, the region in which the pressure gradient acts, the die 6 is supported solely by the members 17 and 18 which define the region of perforation, while the die 6 itself is subjected to the pulling action along its generatrices by the jaw members 13.

More particularly, the strength of the pulling action along the generatrices may be adjusted precisely by means of the jack 16, so as to adapt precisely the magnitude of the deformations of axial contraction and extension to which the die 6 is subject as a result of the temperature variations.

Five connecting members, indicated 27 in the drawing, extend so as to connect the support members 17 and 18. As may be seen in FIG. 3, however, the members 27 do not extend close to the lips 19 and 20 on which the die 6 slides and are thus totally disengaged from the die 6 itself. The members 27 have solely the function of strengthening the connection between the members 17 and 18 which support the die 6 rigidly, without interfering directly with their supporting action.

In the variant shown in FIG. 6, the support members 17 and 18 are connected instead by transverse stiffening zones or members 28 which extend effectively in the plane of sliding of the die 6, in a generally circumferential direction relative to the cylindrical body 4.

The function of the members 28 is to occlude completely the holes in the die 6 in the axial regions which slide on the bands 28. In other words, the presence of the zones 28 gives rise to a situation like that which would occur if the die 6 were perforated only in certain predetermined axial zones instead of being perforated continuously.

However, it should be specified that, even when the zones 28 are present, the die 6 is supported in the regions exposed to the pressure gradient, that is, in the regions left uncovered by the zones 28, solely upstream and downstream of the region of perforation, while the die itself is supported under traction along its generatrices by the jaws 13 and 14.

The bands 28 enable the film F to be perforated selectively, as illustrated schematically in FIG. 7.

In this case, the film F, which includes unperforated zones $F_2$ as well as perforated zones $F_1$, may be divided into strips by cutting along lines C extending along median lines of the unperforated zones $F_2$.

Each strip obtained in this way can thus be used, as illustrated in FIG. 8, for covering a sanitary article such as a sanitary towel for women.

The article in question is constituted essentially by an absorbent wad M of cellulose fluff or like material which must be enveloped in a permeable outer covering on one side (the upper side) of the wad M and an impermeable covering on its opposite side (the lower side).

In this case, each cut portion of film F is wrapped over the wad M with the perforated strip $F_1$ on the upper side, the two lateral unperforated strips obtained by cutting the two unperforated strips $F_2$ being adjacent the lower side of the wad M. The two unperforated strips are then connected along their free edges, for example by spots of glue G or heat-welding. An identical closing or welding action may then be achieved along the end edges of the towel, which is thus completed.

Naturally, the principle of the invention remaining the same, the constructional details and forms of embodiment may be varied widely with respect to those described and illustrated, without thereby departing from the scope of the present invention.

We claim:

1. In a method for the production of perforated films in which a softened unperforated film brought into contact with a perforated die which moves generally in a cylindrical manner and is exposed, in a predetermined region, to a pressure gradient which acts substantially radially of the die to cause the local penetration of the film into the holes in the die and the consequent perforation of the film, the improvement comprising the steps of:

supporting the die in a substantially rigid manner solely upstream and downstream of the predetermined region in the common direction of movement of the film and of the die, and subjecting the die to a pulling action along its generatrices, at least in proximity of the predetermined region.

2. A method according to claim 1, wherein the die is subjected to a pulling action along its generatrices in positions which are equiangularly-spaced from each other.

3. A method according to claim 1 including the step of cooling the die adjacent the portion downstream of the predetermined region.

4. A method according to claim 3, including the step of projecting a flow of cooling fluid through the die adjacent the portion downstream of the predetermined region.

5. A method according to claim 4, wherein the flow of cooling fluid is projected in opposition to the pressure gradient so as to cause part of the flow of cooling fluid to pass back again through the die as a result of the pressure gradient.

6. Apparatus for the production of perforated films, in which a softened unperforated film and a perforated die which is generally cylindrical in movement are brought into contact and exposed, in a predetermined region, to a pressure gradient which acts radially of the die to cause the local penetration of the film into the holes in the die and the consequent perforation of the film itself, including:

a rotary cylindrical body with two circular end edges and a perforated peripheral wall portion constituting the die, two rigid support members extending side by side in the direction of the generatrices of the cylindrical body in a position of sliding support for the perforated peripheral wall portion constituting the die, and together defining the predetermined region, tensioning means for the cylindrical body, including pulling members which cooperate slidingly with the circular end edges and can apply a pulling action to the cylindrical body along its generatrices, and pump means acting in the predetermined region in order to generate the pressure gradient.

7. Apparatus according to claim 6, wherein the pulling members comprise at least one pair of pulling members opposed axially relative to the cylindrical body and located close to the support members.

8. Apparatus according to claim 6 including a plurality of pairs of pulling members, equiangularly distributed about the cylindrical body.

9. Apparatus according to claim 6, wherein each pulling member includes at least one rotary body in rolling cooperation with a respective end edge of the cylindrical body.

10. Apparatus according to claim 6, wherein at least one pulling member, of each pair carries an associated pulling drive member with adjustable drive strength.

11. Apparatus according to claim 10, wherein the pulling drive member is a fluid jack.

12. Apparatus according to claim 6, wherein the two support members are constituted essentially by straight blades provided with rigid lips of material with a low sliding friction and cooperating in a sliding manner with the perforated peripheral wall portion constituting the die.

13. Apparatus according to claim 6 wherein the two support members are connected together by stiffening members which are wholly disengaged from the perforated peripheral wall portion constituting the die.

14. Apparatus according to claim 6, wherein the two support members are disposed substantially within the cylindrical body and the pump means are constituted by a suction source acting between the support members themselves.

15. Apparatus according to claim 6, including a source of fluid for heating the film which acts in a fixed position with respect to the two support members.

16. Apparatus according to claim 6 including a source of cooling fluid which can project a flow of cooling fluid onto the perforated peripheral wall portion constituting the die adjacent that one of the two support members disposed downstream of the predetermined region.

17. Apparatus according to claim 16, wherein the source of cooling fluid is located within the rotary cylindrical body and in that screening means are provided for controlling the propagation of the cooling fluid within the predetermined region.

18. Apparatus according to claim 6, for producing perforated films in a generally strip configuration wherein connecting zones are provided between the support members and extend generally circumferentially relative to the rotary cylindrical body in positions of sliding contact with the perforated peripheral wall portion constituting the die so as locally to occlude the perforations of the die.

* * * * *

UNITED STATES PATENT AND TRADEMARK OFFICE
CERTIFICATE OF CORRECTION

PATENT NO. : 4,806,303

DATED : February 21, 1989

INVENTOR(S) : Bianco et al.

It is certified that error appears in the above-identified patent and that said Letters Patent is hereby corrected as shown below:

Column 2, line 63, replace "minimise" with --minimize--.

Column 3, lines 7-8, replace "characterised" with --characterized--.

Column 6, line 66, replace "stabilising" with --stabilizing--.

Column 6, line 23, after "manner" insert --with the speed of advance of the film F (the speed of--.

Signed and Sealed this

Twenty-fifth Day of December, 1990

*Attest:*

HARRY F. MANBECK, JR.

*Attesting Officer* *Commissioner of Patents and Trademarks*